Aug. 6, 1929.  E. J. PILBLAD  1,723,252

VEHICLE SUSPENSION DEVICE

Filed July 22, 1926  6 Sheets-Sheet 1

INVENTOR.
Eric J. Pilblad
BY HIS
ATTORNEY.

Aug. 6, 1929.  E. J. PILBLAD  1,723,252
VEHICLE SUSPENSION DEVICE
Filed July 22, 1926  6 Sheets-Sheet 2

INVENTOR.
Eric J. Pilblad
BY HIS
ATTORNEY.

Aug. 6, 1929.   E. J. PILBLAD   1,723,252
VEHICLE SUSPENSION DEVICE
Filed July 22, 1926     6 Sheets-Sheet 3

INVENTOR.
Eric J. Pilblad
BY HIS
ATTORNEY.

Aug. 6, 1929. E. J. PILBLAD 1,723,252
VEHICLE SUSPENSION DEVICE
Filed July 22, 1926 6 Sheets-Sheet 6

INVENTOR.
Eric J. Pilblad
BY HIS
ATTORNEY.

Patented Aug. 6, 1929.

1,723,252

UNITED STATES PATENT OFFICE.

ERIC J. PILBLAD, OF ROCKVILLE CENTER, NEW YORK, ASSIGNOR, BY MESNE ASSIGNMENTS, TO LEOPARD AUTOMOBILE PRODUCTS CORPORATION, OF NEW YORK, N. Y., A CORPORATION OF DELAWARE.

VEHICLE SUSPENSION DEVICE.

Application filed July 22, 1926. Serial No. 124,154.

My present invention relates to spring supporting devices for vehicle bodies and it has for its object to provide an arrangement of parts which may be assembled in the form of units and interposed between the axles or running gear and the body of the vehicle, or the frame on which it is carried, to provide a form of yielding suspension which will minimize the vibration due to inequalities in the road bed and will absorb the shocks due to rebounding actions.

A further important feature of my invention resides in providing a yielding connection between the axles and the body, or frame, which maintains the desired low center of gravity and at the same time avoids interference of the connecting elements with the axles when relative movements occur under varying conditions of the load, road inequalities, and rate of travel of the vehicle.

One of the principal features of my invention relates to a novel means of checking the rebound or sudden return occurring after the load spring has been compressed by applying an automatic brake, or friction control, which commences its action at the instant the compression load is relieved and is capable of action to a greater or less degree proportional to the amount of such compression, thus insuring smooth and steady riding qualities to the vehicle when traveling over rough and uneven road beds.

Another object of my invention is to provide a type of suspension device capable of being used for supporting either the front or rear ends of the body, or frame, separately on the corresponding front and rear axles and which are susceptible of ready application to automobile chassis constructions of standard makes, and which may be quickly and easily substituted for the forms of springs usually supplied by the original manufacturers of such vehicles.

To these and other ends my invention further consists in certain other novel features which are set forth more in detail in the following specification and particularly described in the appended claims.

In the drawings:

Fig. 6 is a longitudinal sectional view taken on the line $6^x$—$6^x$ of Fig. 5.

Fig. $6^a$ is a sectional view on the line $6^a$—$6^a$ of Fig. 5 illustrating the frame clamping device.

Fig. $16^a$ is a view of the key plate which locks the pivot bolt in the bracket.

In the drawings, like characters of reference indicate corresponding parts in all the figures.

My invention contemplates the construction of vehicle suspension devices which may be inserted between the front and rear axles and the body or the frame on which the latter is supported, and are so constructed as to facilitate their being assembled in pairs and means of connecting two such pairs of members into unitary structures, so designed that the respective front and rear units of a given type of vehicle may be quickly and easily attached to the axles and frame of such vehicle.

In carrying out my invention, the vehicle body is supported by a plurality of yielding suspension devices each of which comprises a pivoted spring-supported rocking member in the form of a bell crank lever, having a load carrying arm A, operatively connected to the axle and a spring operated arm B connected to a supporting spring C, and a rebound or check spring D. It is preferable that the vehicle should be provided with four such spring supporting devices, of which two form the connection between the front axle and the body of the vehicle and two form the connection between the rear axle and the body of the vehicle. It is obvious of course, that under certain circumstances, the supporting devices might be placed between the body and the front axle or between it and the rear axle alone.

Figure 1:
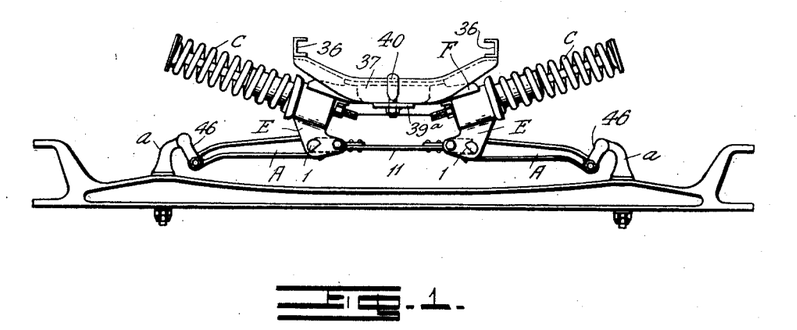
Figs. 1 and 2 are front and rear elevations, respectively, of one embodiment of the invention illustrating a suspension device applied to the front and rear axles of an automobile.
Figure 2:
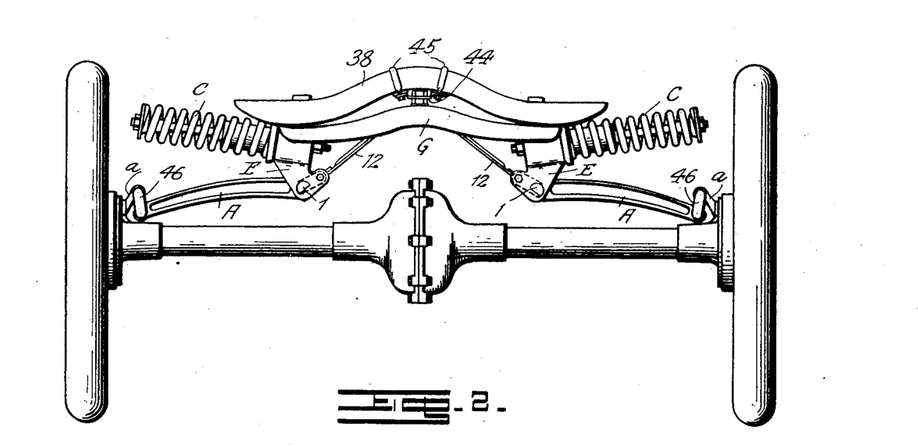
Figure 3:
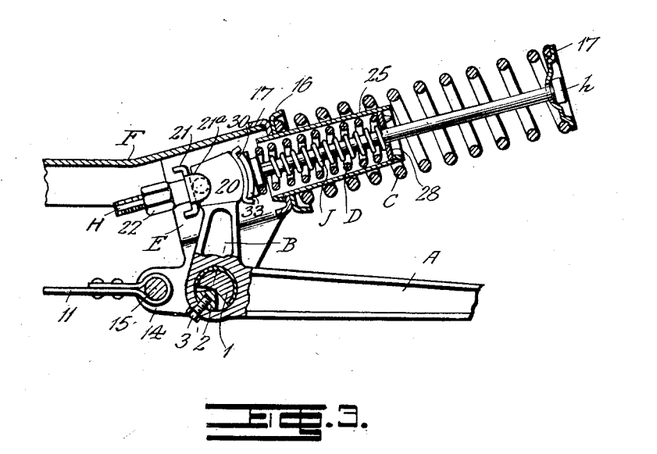
Figs. 3 and 4 are enlarged vertical sectional elevations showing certain details of the suspension devices of the front and rear units.
Figure 4:
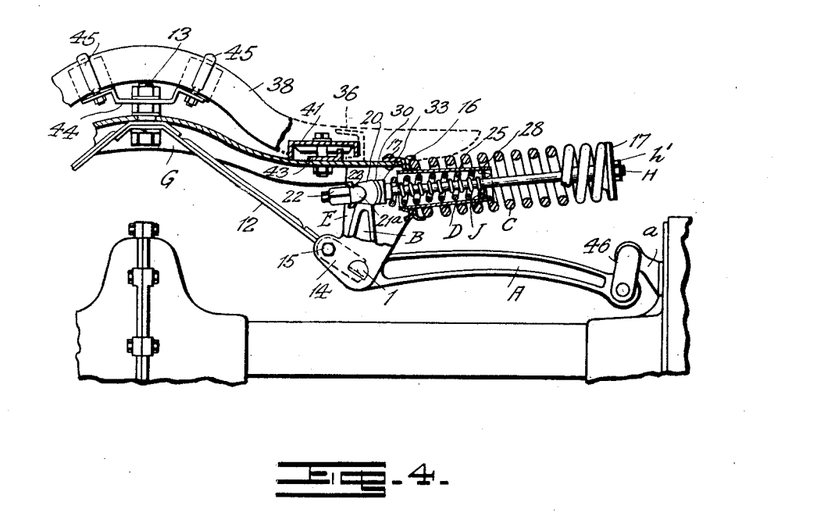
Figure 5:
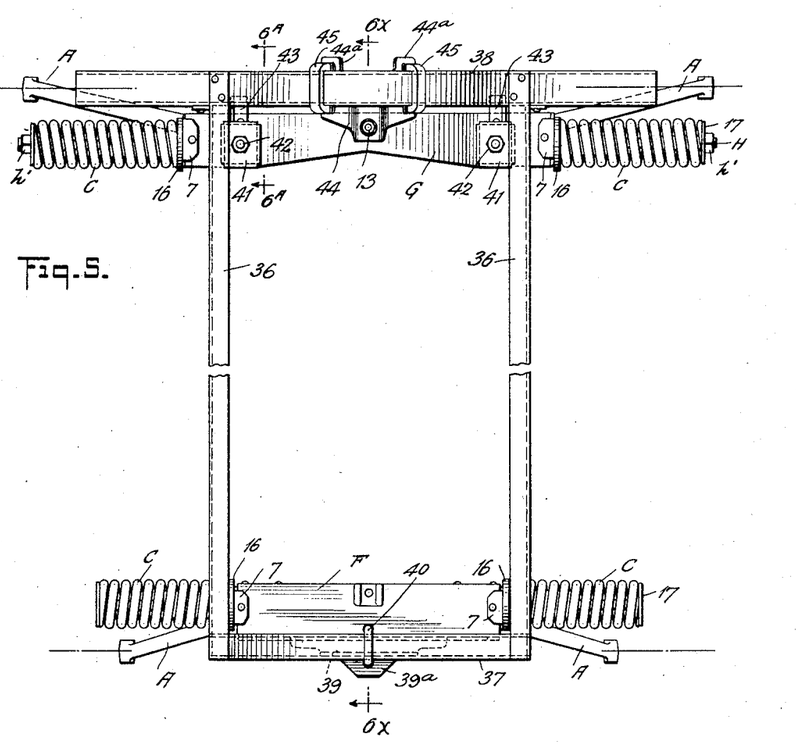
Fig. 5 is a plan view of a chassis showing the positions of the front and rear suspension devices relatively to the vertical planes of the two axles.
Figure 13:
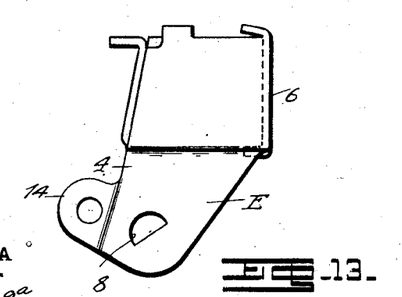
Fig. 13 is a detail side elevation of one of the frame brackets in which the arms of the suspension devices are pivoted.

The supporting devices, or brackets E (Figs. 6 and 13) are disposed at one side of the vertical plane of the respective axles for the dual reason that such arrangement permits the vehicle body being supported with a low center of gravity, while also affording the requisite space between the axle and body to allow the latter to move vertically sufficiently under various conditions of load and road inequalities, without engaging the axle in its downward movement or rising in its upward movement to an elevation which permits the mass to tend to pitch and sway. In practice, I dispose the supports of the front unit slightly in the rear of the front axle and those of the rear unit a short distance in front of the rear axle as shown in Fig. 5, but it will be understood that they may be otherwise located relatively to the planes of the axles indicated by the dotted lines in Fig. 5. This offsetting of the brackets E, which I consider an important part of my invention, is rendered possible by other features of the invention as will be explained. It will be observed that the outer ends of the load carrying arms A are hung on the perches $a$ and are therefore in the plane of the axle, hence the brackets E carrying the fulcrum points of the levers move vertically in a different plane. The torsional strain thus set up I obviate by offsetting the lever arm B, or spring operating arm, to obtain a load balance which reduces the friction to a minimum.

The brackets E I provide with transversely extending pins 1, passing through the hubs of the rocking members and having their lower portions cut away to provide an inverted trough shape face in which rocks the knife edge of a segmental member 2 secured in the hub by means of a screw 3.

Figures 6, 6A:
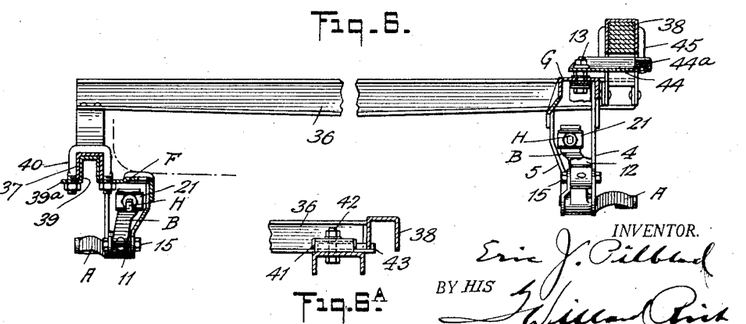
Figure 7:
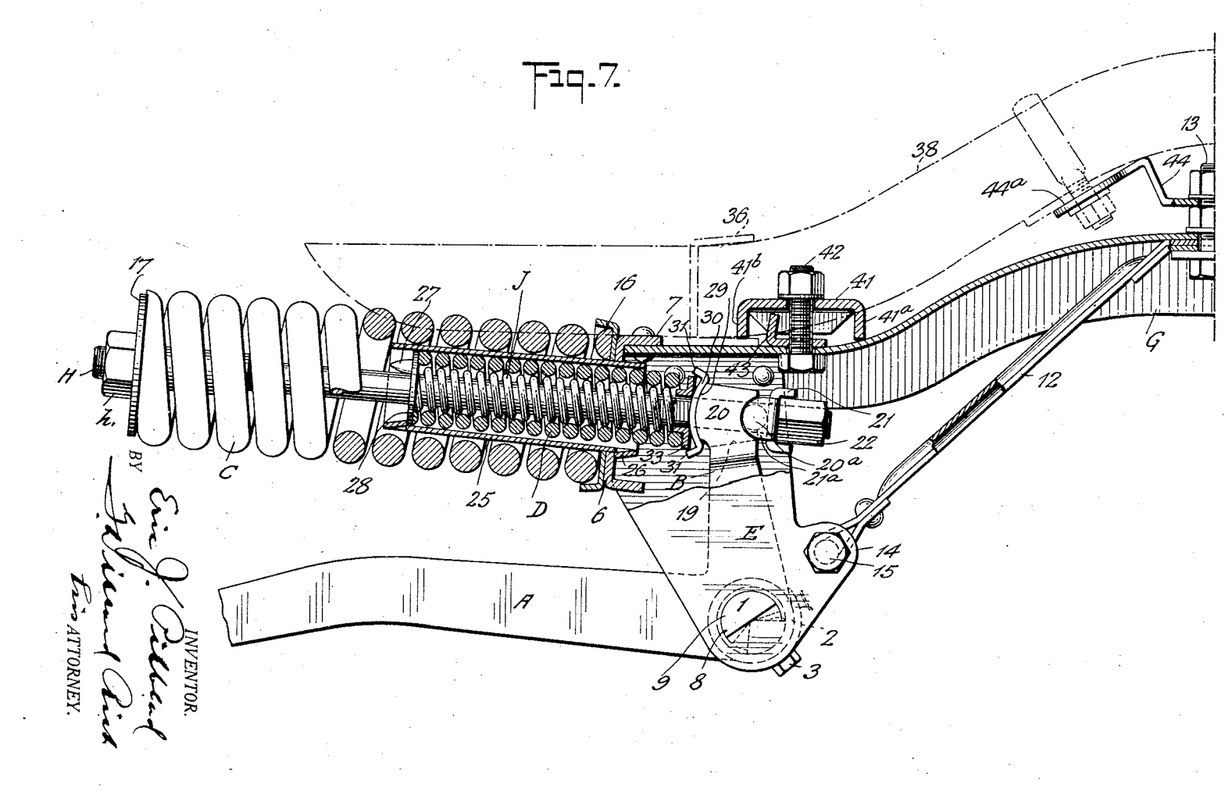
Fig. 7 is a view showing one of the suspension devices enlarged.

The bracket members E are made in the form shown in Figs. 6 and 7, those for the forward unit being mounted at opposite ends of a cross bar or beam F, and those for the rear unit secured to the beam G which is of a slightly different shape. Each bracket member is pressed from sheet metal and is riveted or otherwise suitably attached to its cross bar. In the form shown, these brackets are formed with side walls 4 and 5 and a connecting side panel 6, which together constitute a U shape member fitting between the edges of the channel beams F and G. The side panel 6 may be formed with a flange 7, which at its upper edge is bent inwardly for engagement with the end of the bar. The side walls 4 and 5 are formed with the apertures 8 which receive and support the ends of the pin 1, and in order to prevent the latter from rotating, these apertures are given segmental shapes corresponding to the ends 9 of the pin 1, whereby the bearing when assembled between the side members 4 and 5 will be held in position thereby and prevented from turning with respect thereto.

Figure 16:
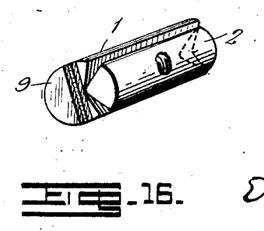
Fig. 16 is a detail perspective view showing the pivot bolt or connection forming the main bearing for the supporting arms.
Figure 16A:
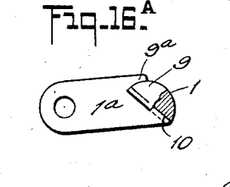
Figure 18:
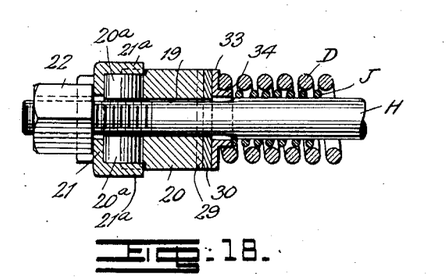
Fig. 18 is a horizontal sectional view on the line $18^x$—$18^x$ of Fig. 8.

The pin 1 is locked securely to the bracket by causing one of its segmental ends to project laterally and securing to the bracket wall a plate $1^a$, such as shown in Fig. $16^a$, having an end which is recessed to provide a finger $9^a$ which will extend over the pin and a lip 10 which will project into a slot or transverse keyway formed in the pin.

To give additional support to the unit structure, the lower parts of the two front brackets E are connected by a tie rod 11 and other tie rods 12 connect the lower extremities of the rear pair of brackets with a central bolt 13 on the cross bar G. Each of the brackets E is formed with ears 14 supporting bolts 15 connected to the tie rods, said bolts also serving as the means of securing the key plates $1^a$.

The body supporting or load carrying spring C is of substantial size, designed to resist the relative movement of approach of the vehicle body and axles. It is mounted at its inner end on a seat 16, which is in the form of a washer bearing against the ends or panels 6 of the brackets E and having a peripheral flange within which the end of the spring fits. Bearing against the outer end of the spring C is a dished spring plate or washer 17, through which a tie rod H extends. The rods H of the forward units are provided with heads $h$ and those of the rear units are provided with sleeve nuts $h'$. The washers bearing against the outer extremities of the springs are dished to provide semi-spherical seats to receive the correspondingly formed inner faces of the heads $h$ and $h'$ so that the rods H will always lie in the axes of the springs.

Figure 15:
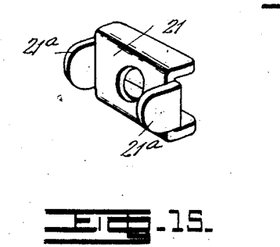
Fig. 15 is a perspective view of the pressure plate.

The inner end of the tie rod H extends through a slot 19 in the head 20 of the arm B of the rocking member, and is connected to said head through an instrumentality which provides a rolling-rocking-connection formed by rollers 20ª lying in semi-circular recesses in the bifurcations of the head 20. Bearing against these rollers is a pressure plate 21 (Fig. 15) on the rod H, held in place by the tension nut 22. This plate is provided with ears 21ª which hold the roller 20ª in position.

The rebound, or check spring D is designed to resist movement of the head 20 of the arm B in the reverse direction to that in which it is resisted by the supporting spring C, and to effect economy in place as well as for convenience in operation, the rebound checking spring is preferably located within the supporting spring C, its outer end being supported by a shoulder offset from the bracket E.

In order to utilize the space within the load spring C for the accommodation of the check spring D and thus obtain a compact arrangement of the parts, I also surround the spring D with a tube 25 having an internal abutment at its outer end with which this spring engages and an external shoulder, or abutment, at its inner end which engages the inner side of the wall 6 of the bracket E through which its extends. These shoulders or abutments on the tube are preferably formed by slitting the tube wall and striking up bosses near its ends, those at its inner end being thrown outwardly, as indicated by 26, and those at its outer end being struck inwardly, as indicated by 27. Bearing against the inwardly projecting bosses is a thrust plate 28, forming a seat for the outer end of spring D, which is provided with an opening of sufficient diameter to permit lateral movement of the rod H as well as its longitudinal movement therethrough.

There are several points in the manner in which I have designed the parts and assembled them, to which attention is directed as they contribute to the practicability of the device and its service ability under the severe conditions to which suspension devices are subjected when a vehicle traverses rough roads at high speed. The load or supporting spring C is necessarily of heavy construction and since it extends horizontally its outer end, if unsupported, will have a tendency to sway. This is overcome of course to a certain extent by the rod H on which the spring exerts a continuous pressure, but this in itself is insufficient to meet the more severe conditions and for this reason I have provided a guide and support for the rod intermediate its ends.

The rebound spring D at its outer end fits closely within the tube 25 against the shoulder or abutment plate 28 therein. An inner spring J closely fits the rod H and the wire, or spring rod, from which said spring is coiled is of such a cross-section that its convolutions exactly fill the space surrounding the rod H, and the inner circumference of the spring D, thus not only serving as a guide for the rod but also serving to prevent the spring D from buckling under pressure or swaying under the transverse jars imparted to it. The spring J may also be made of such length and tension that it will come into play to increase the frictional resistance of the brake shoe 30 against the face 29 at any desired point in the movement of lever B.

It will be noted that the outermost convolution of the spring D fits the tube 25 snugly and forms a fulcrum point about which the rod H moves slightly due to the rocking of its inner end and to permit such movement to occur freely, I taper the tube 25 so that it is slightly larger at its inner end. This formation of the tube also permits its larger end which fits the interior of spring C to serve as the means for centering it on the bracket E, and as the tube decreases gradually in size toward its outer end, the succeeding convolutions of spring C do not engage therewith.

The rebound check spring D performs a dual function in that it opposes the movement of the spring bearing arms B of the lever connecting member and also automatically applies the brake device which is interposed between it and the arm B and controls the braking action in proportion to the amplitude of movement of the lever.

The face of the end 20 of the arm B is curved, as indicated at 29, and resting thereon is an arcuate shaped brake shoe 30, (Fig. 10) having rearwardly extending flanges 31. The shoe is also provided with a series of perforations 32, in which plugs of suitable absorbent material are secured for the purpose of carrying a lubricant that will be sufficient to prevent the parts from binding when under severe pressures. The shoe is supported by a backing member or plate 33, (Fig. 11) which fits between the flanges 31. This plate is similarly curved at its edges to rest against the shoe and at its center is provided with a collar 34 and a raised portion 34ª forming a seat for the inner end of the rebound check spring D.

From the arrangement of the parts just described, it will be seen that as the lever connecting member is rotated on its fulcrum point, either by the upward movement of the axle or by the downward movement of the vehicle body, that the arm B is rotated inwardly toward the longitudinal axis of the vehicle in a direction to compress the load spring C, by drawing the connecting rod H inwardly. This movement of the arm B is followed by the expansion of the spring D which holds the brake shoe 30 in engagement with the face of the lever 29. Upon reaching the limit of its movement, the arm B immediately commences to travel in the opposite direction. The spring D is normally under slight compression, hence there is a normal braking action to the initial inward movement of the arm B so that the take up on the load spring is a gradual one at the beginning, and as the take up increases the braking effect is lessened as the spring D expands. However, as the compression of the latter is such that its pressure is never wholly released it will be seen that as the lever B begins to return toward its normal position, it does so against a resistance sufficient to render its movement smooth and that such resistance continually increases, hence at the moment the lever B passes its normal position, in returning or rebounding, under the influence of the load spring C, it will be seen that the braking action has become enormously increased due to the further compression of the rebound spring D and J.

Figures 8, 9, 10, 11, 12, 14, 17:
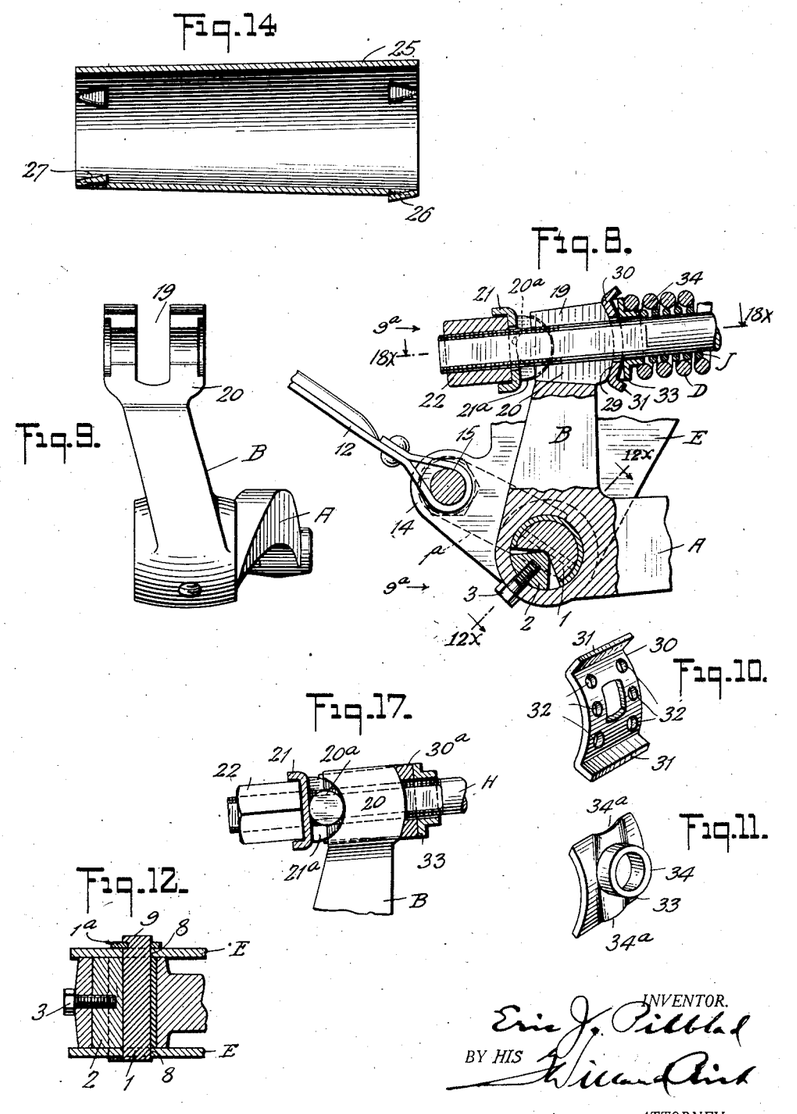
Fig. 8 is a view showing the rocking lever in elevation, and its bracing and suspension connections in section.
Fig. 9 is a view looking in the direction indicated by the arrows $9^a$ in Fig. 8, showing the manner in which the spring bearing arm is offset from the load carrying arm to effect a balance of the lever on its pivot.
Figs. 10 and 11 are detail perspective illustrations of the brake shoe and its holder, respectively.
Fig. 12 is a sectional detail taken on the line $12^x$—$12^x$ of Fig. 8 showing the knife edge bearing on which the supporting members are pivoted.
Fig. 14 is an enlarged longitudinal sectional view of the housing for the rebound check spring.
Fig. 17 is a detail view showing a side view of the head of the lever to which the spring suspension devices are connected and a modified form of brake shoe.

In Fig. 17 I have shown the brake shoe 30ᵃ in the form of a casting which is preferably of bronze.

The apparatus described is adapted to be inserted between the front and rear axles of a vehicle and the body or frame on which it is supported, the former expression being sufficiently comprehensive to include the latter so that these expressions will be understood to be synonymous or equivalent terms wherever used. In Fig. 5 the frame is shown as comprising the rails or side pieces 36—36, the front bolster or cross piece 37, and a similar rear connecting member 38, all of which are usually constructed by channels. The front bolster in the type of frame shown curves downwardly and the rear bolster is arch shaped.

The cross bar F of the front unit is made of pressed steel and has a central portion 39 that is channel shaped to fit within the channel of the bolster 37 to which it is rigidly bolted by a clevis 40 which straddles the bolster, its ends passing through apertures in the ear 39ᵃ and in the body of the cross bar F. The bar F, it will be observed, is offset on a plane coincident with the lower edge of the bolster 37 and in such a position that its rear edge fits against the bottom of the forward edge of the usual engine crank case, indicated by dotted lines in Fig. 6, or some other support which may be provided to firmly brace the bar at its center.

The rear unit is secured by forming the cross bar G as an arch shaped channel with horizontal extremities which lie beneath the longitudinal frame pieces 36—36. On these ends of the member G are box shaped clamping pieces 41 extending within the channels of the frame pieces having downwardly projecting flanges 41ᵃ and 41ᵇ, the former being shorter than the latter and adapted to engage the lower rail of a channel piece. These clamping boxes are each secured by a bolt 42 to the bar G, and positioned on these bolts and within the boxes 41 are positioning lugs 43 which engage the inner edges of the frame pieces 36—36 and center the rear suspension unit independently of the devices 41 by which it is rigidly secured, the positioning lugs 43 also extend rearwardly from beneath the boxes 41, and engage the adjacent edge of the frame piece 38 to anchor the ends of the cross bar G to the vehicle frame. At the center of the bar G and secured by the bolt 13 is a laterally extending bracket 44 having offset angularly disposed faces 44ᵃ through which pass the ends of U shaped clamping bolts 45 which embrace the frame bolster 38.

The load carrying extremities of each of the rocker arms or supporting members, A are suitably connected to the two axles by shackles 46. These connections on both the front and rear axles are designed to utilize the perches a, provided for the usual springs with which automobile manufacturers equip their automobiles originally and with the further idea of keeping the center of gravity of the supported body as low as possible, and certainly no higher than that provided by the manufacturer, in instances where the suspension units are substituted for the original sets of springs.

In the arrangement of units of the form I have illustrated four points of yielding suspension are provided located at the outer corners of the vehicle frame each of which operates independently of the others, excepting for such complementary action as may occur, so that road shocks of minor character encountered by the vehicle wheels separately will be absorbed by the suspension device adjacent such wheel.

By extending the several load carrying arms A inwardly from their points of connection at the ends of the axles and leading them laterally over the tops of the axles to fulcrum points on the frame or body located adjacent but out of the vertical planes of said axles, I am able to obtain the benefit of long load carrying arms and proportionally long upwardly extending spring connecting arms without raising the body of the vehicle, as the fulcrum points being offset from the axles are free to move to any extent permitted by the springs and without being otherwise limited by striking the axles.

As many changes could be made in the above described construction, and many apparently widely different embodiments of my invention constructed within the scope of the claims, without departing from the spirit or scope thereof, it is intended that all matter contained in the accompanying specifications and drawings shall be interpreted in an illustrative and not in a limiting sense.

In accordance with the provisions of the patent statutes the principle of the invention has been described, and exemplified by combinations of materials which in practice have proved to be satisfactory embodiments thereof, but it is desired to have it understood that the examples given are merely illustrative, and that the invention may be carried out in other ways.

The invention having been described, what is claimed as new and desired to be secured by Letters Patent is as follows:—

1. In a yielding supporting mechanism for vehicles, the combination with a body frame and an axle, of two bell crank levers fulcrumed on the body frame in a plane at one side of the axle having relatively long horizontal and short vertical arms, the former extending over the opposite ends of the axle to their points of connection therewith and curved to permit their fulcrums to pass below the top of the axle at one side thereof, said short arms having their upper extremities offset from the fulcrums in a direction away from the axle a distance proportional to their lengths, which is equal to the proportion between the off-set of the ends of the longer arms and their lengths, and springs cooperating with the frame and extending transversely thereof in alignment with the extremities of the short arms.

2. The combination with a vehicle frame and an axle, of a cross member on the frame at one side of the vertical plane of the axle, bearing brackets depending from said member having load carrying journals, of bell crank levers pivoted on said journals comprising load carrying arms extending outwardly and laterally over the axles and pivoted thereon, and upwardly extending spring bearing arms, springs carried by the cross member and connections between the springs and said upwardly extending arms yieldingly supporting the weight of the vehicle frame.

3. The combination with an axle, a vehicle frame, and means for yieldingly connecting said parts comprising a pivoted lever and a load spring resisting movement of the lever in one direction, of a rebound spring and a friction device engaging the lever and acted upon by the last mentioned spring.

4. In a device of the character described, comprising supporting and supported members, the combination with a lever pivoted to each and a spring acting on the lever to support the load carried by the lever, of a rebound spring and a brake member held thereby in frictional engagement with the lever.

5. A device of the character described, comprising supporting and supported members, a lever pivoted to each and a spring acting on the lever to yieldingly support the load carried by the lever, a rebound spring engaging the lever under varying tension in accordance with its position and a frictional brake member engaging the lever and actuated by said rebound spring.

6. In vehicle supporting devices, the combination with a bell crank lever for attachment to a vehicle body, having a load carrying arm adapted to be connected to a vehicle axle and comprising a spring carrying arm, a spring cooperating therewith and yieldingly supporting said arm and the weight of the vehicle body, a brake device frictionally bearing against the last mentioned arm and means for increasing such friction upon movement of the arm in one direction.

7. A yielding supporting connection between a vehicle axle and a vehicle body comprising a lever and compression and expansion springs cooperating with the lever to oppose its movement in opposite directions, a braking device cooperating with the lever and actuated by one of said springs.

8. A yielding supporting connection between a vehicle axle and vehicle body comprising a lever, compression and expansion springs yieldingly opposing the movement of the lever in opposite directions, a brake shoe engaging the lever and actuated by the expansion springs to exert a continuous pressure during movement of the lever and an increasing pressure upon its movement in one direction.

9. A yielding supporting connection between a vehicle axle and vehicle body comprising a bell crank lever, compression and expansion springs engaging one end of the lever and yieldingly opposing its movement in opposite directions, a brake shoe interposed between the expansion spring and said end of the lever and serving to exert a retarding action in the direction of the movement of the lever in which the expansion spring is compressed.

10. A yielding supporting connection between a vehicle axle and vehicle body comprising a lever, compression and expansion springs located at one side of the lever, connections between them and said lever operating upon opposite sides thereof to oppose its movement in opposite directions, a braking device engaging said lever and actuated by one spring to retard the movement of the lever on its pivot in both directions and to automatically increase such retardation upon its continued movement in the direction which compresses the expansion spring.

11. A yielding supporting connection adapted for use between a vehicle axle and vehicle body comprising a lever, a compression load spring acting on one side of the lever, a rebound spring acting upon the opposite side of the lever, a braking device actuated by the rebound spring to oppose the movement of the lever in a direction in which the load on the compression spring is released.

12. A yielding connection adapted to be used between supported and supporting members arranged for relative movement comprising a lever pivoted to both members and springs connected to one of the members and operating on the lever to oppose the relative movement of said members, a braking device cooperating with the lever and actuated by one of the springs to retard the action imparted to said lever by the movement of said members in a direction away from each other.

13. A yielding connection adapted for use between a vehicle axle and a vehicle body comprising a bell crank lever pivoted on the body and having one arm connected to the axle, the other arm having a head provided with a curved friction surface, a compression load spring and an expansion spring carried by the body and arranged to cooperate with said head to oppose movement of the lever in opposite directions and a curved brake shoe lying between the friction surface on the head and said expansion spring.

14. In a device of the character described, the combination with a support, a lever and a knife edge bearing member carried thereby, of a journal pin carried by the support having a bearing face receiving the knife edge.

15. In a device of the character described, the combination with a bracket having side pieces, and a lever pivoted between them having a journal aperture, of a bearing for the lever comprising a stationary pin carried by the side pieces of the bracket and a member attached to the lever and resting in rocking engagement with the pin and means for securing the pin to the bracket.

16. In a vehicle suspension device the combination with a vehicle frame, a frame piece extending thereacross and attached thereto, brackets at the ends of the frame piece having downwardly extending side pieces, and levers pivoted on the latter having apertured extremities of springs bearing at one end against the brackets, tie rods extending through the springs and the apertures in the levers and connecting the outer ends of the springs to said levers.

17. In a device of the character described the combination with a bracket, a lever journaled thereon having a head provided with an aperture and a spring having one end seated on the bracket, of a tie rod extending through the lever and connected to the outer end of the spring and a roller interposed between the end of the lever, and the contiguous end of the rod.

18. In a device of the character described the combination with a support, a pivoted lever and a spring resting at one end against the support, of a depressed bearing face on the side of the lever away from the spring, a roller engaging therewith and a tension rod engaging the roller and the outer end of the spring.

19. In a device of the character described the combination with a support, a pivoted lever having an apertured end provided with depressed bearing faces on one edge at opposite sides of the aperture and rollers resting therein, of a pressure member resting against the rollers of a spring bearing at one end against the support, and a tension rod connecting the outer end of the spring with the pressure member.

20. In a device of the character described the combination with a support, a spring extending outwardly therefrom and a lever pivoted on the support having a bearing face on its side away from the spring, of a roller resting thereon, a pressure member engaging the roller and adjustable tension connections between said member and the outer end of the spring.

21. In a vehicle suspension device the combination with a support having offset external and internal spring seats, and a pivoted lever having an end in alinement with said seats, of a load spring having its inner end resting against the external seat, a rebound spring resting with its outer end against said inner seat, means connecting the outer end of the load spring with the remote side of the lever and a friction member located between the inner end of the rebound spring and the contiguous side of the lever.

22. In a spring suspension device for vehicles, the combination with a support having an external spring seat, a tubular extension on said support facing an offset internal spring seat, a load spring having its inner end resting on the external seat and a rebound spring within said tube, of a pivoted lever having an apertured end lying in the axes of said springs, a tie rod connecting the outer end of the load spring with the opposite side of the lever and a friction member located between the inner end of the rebound spring and the proximate face of the lever.

23. In a spring suspension device for vehicles, the combination with a bracket having an apertured side wall and an external spring seat, a load spring having its inner end resting thereon, a tubular extension projecting through the aperture into said spring and a rebound spring located in the tube, of a lever pivoted on the bracket having an aperture head located in alinement with said springs, a rod extending through the springs and the head of the lever and connecting the rear side of the latter with the outer end of the load spring, a friction device between the forward side of the lever head and the rebound spring.

24. In a spring suspension device for vehicles, the combination with a bracket having an apertured side wall and an external spring seat, a load spring having its inner end resting thereon, a tapered tubular extension projecting through the aperture into said spring having an apertured spring seat at its outer end, and a rebound spring located in the tube, of a lever pivoted on the bracket having an apertured head located in alinement with said springs, a rod extending through the springs and the head of the lever and connecting the rear side of the latter with the outer end of the load spring, a friction device between the forward side of the lever head and a filler spring surrounding the rod within the rebound spring.

This specification signed and witnessed this 20th day of July, 1926.

ERIC J. PILBLAD.